US008310553B2

(12) United States Patent
Matsunaga

(10) Patent No.: US 8,310,553 B2
(45) Date of Patent: Nov. 13, 2012

(54) IMAGE CAPTURING DEVICE, IMAGE CAPTURING METHOD, AND STORAGE MEDIUM HAVING STORED THEREIN IMAGE CAPTURING PROGRAM

(75) Inventor: Kazuhisa Matsunaga, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 318 days.

(21) Appl. No.: 12/706,174

(22) Filed: Feb. 16, 2010

(65) Prior Publication Data

US 2010/0209009 A1 Aug. 19, 2010

(30) Foreign Application Priority Data

Feb. 17, 2009 (JP) ................................. 2009-033913

(51) Int. Cl.
*H04N 5/228* (2006.01)
(52) U.S. Cl. ................................................. 348/208.99
(58) Field of Classification Search ........................ None
See application file for complete search history.

(56) References Cited

U.S. PATENT DOCUMENTS

| 7,538,794 | B2 * | 5/2009 | Turley et al. | 348/208.1 |
| 7,796,872 | B2 * | 9/2010 | Sachs et al. | 396/55 |
| 8,018,495 | B2 * | 9/2011 | Li et al. | 348/208.6 |
| 2003/0095189 | A1 | 5/2003 | Liu et al. | |
| 2004/0218830 | A1 * | 11/2004 | Kang et al. | 382/274 |
| 2006/0017837 | A1 | 1/2006 | Sorek et al. | |
| 2006/0158523 | A1 | 7/2006 | Estevez et al. | |
| 2006/0187308 | A1 * | 8/2006 | Lim et al. | 348/208.4 |
| 2008/0170126 | A1 | 7/2008 | Tico et al. | |
| 2009/0207258 | A1 | 8/2009 | Jang et al. | |

FOREIGN PATENT DOCUMENTS

| JP | 2005-136760 A | 5/2005 |
| JP | 2006-245847 A | 9/2006 |
| JP | 2008-092005 A | 4/2008 |
| JP | 2008-124625 A | 5/2008 |
| JP | 2008-278444 A | 11/2008 |
| JP | 2008-311907 A | 12/2008 |

OTHER PUBLICATIONS

Extended European Search Report dated May 11, 2010 (in English) in counterpart European Application No. 10151652.4.
Japanese Office Action dated Jan. 11, 2011 and English translation thereof in counterpart Japanese Application No. 2009-033913.

* cited by examiner

*Primary Examiner* — Luong T Nguyen
(74) *Attorney, Agent, or Firm* — Holtz, Holtz, Goodman & Chick, PC

(57) ABSTRACT

A digital camera carries out the following steps. The digital camera acquires one image photographed with a high sensitivity for subject-blur suppression, four images of a first group consecutive in a time series photographed with an ordinary exposure time, and four images of a second group consecutive in a time series photographed with an exposure time shorter than the ordinary exposure time for multiplane addition. Then, the digital camera extracts, from among the images photographed with the ordinary exposure time, an image for which blur caused by hand movement is minimum, and if no image blur has occurred and if blur caused by hand movement is less than a predetermined value, selects the image. The digital camera selects the image for subject-blur suppression if image blur has occurred for the extracted image. Also, the digital camera generates a new image by carrying out multiplane addition of images for multiplane addition if blur caused by hand movement has occurred for the extracted image.

10 Claims, 7 Drawing Sheets

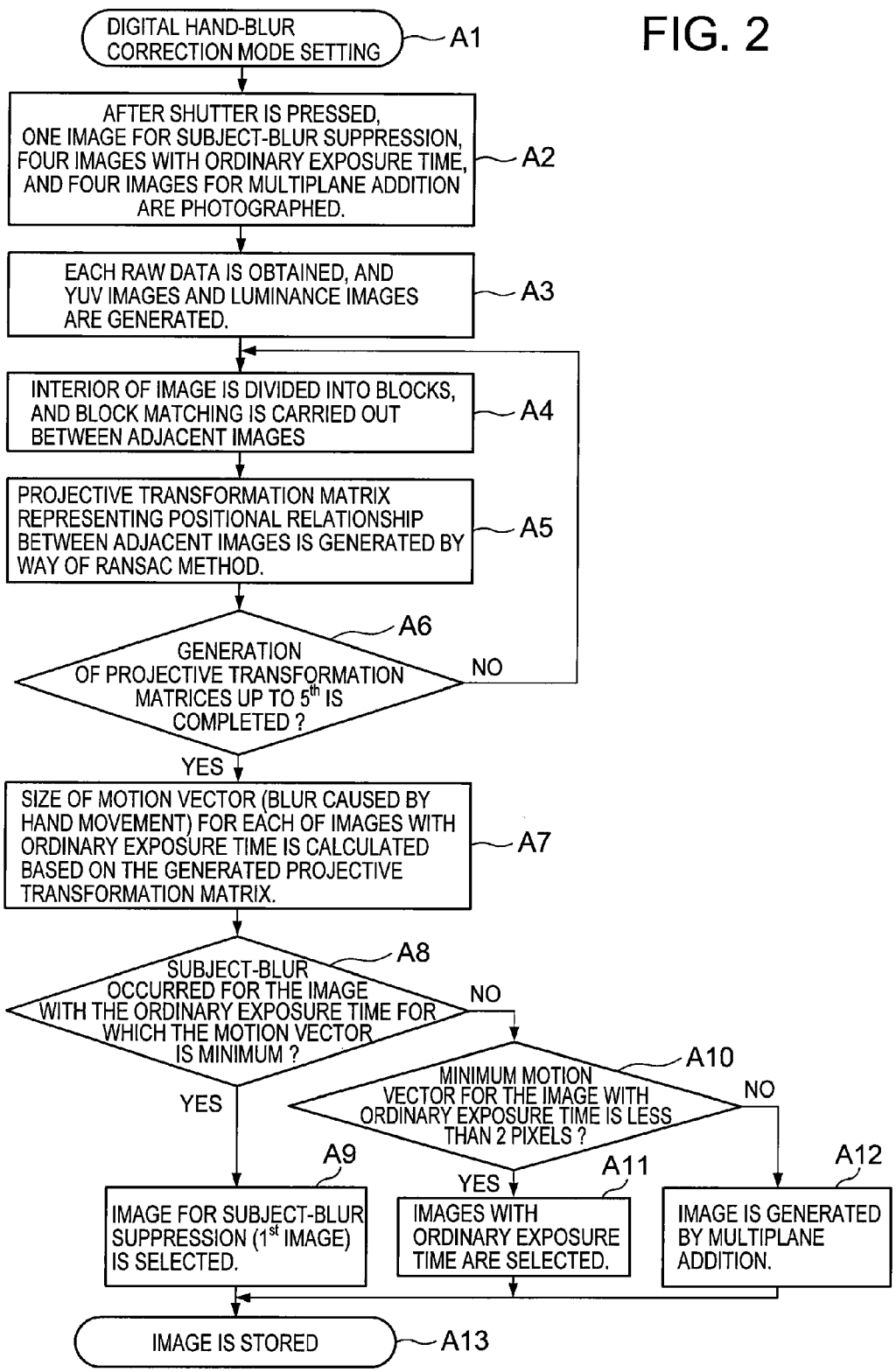

$$\begin{bmatrix} a & b & s \\ c & d & t \\ u & v & 1 \end{bmatrix}$$ PROJECTIVE TRANSFORMATION MATRIX BETWEEN IMAGES $|mv|$ (SIZE OF MOTION VECTOR) $= \sqrt{s^2 + t^2}$

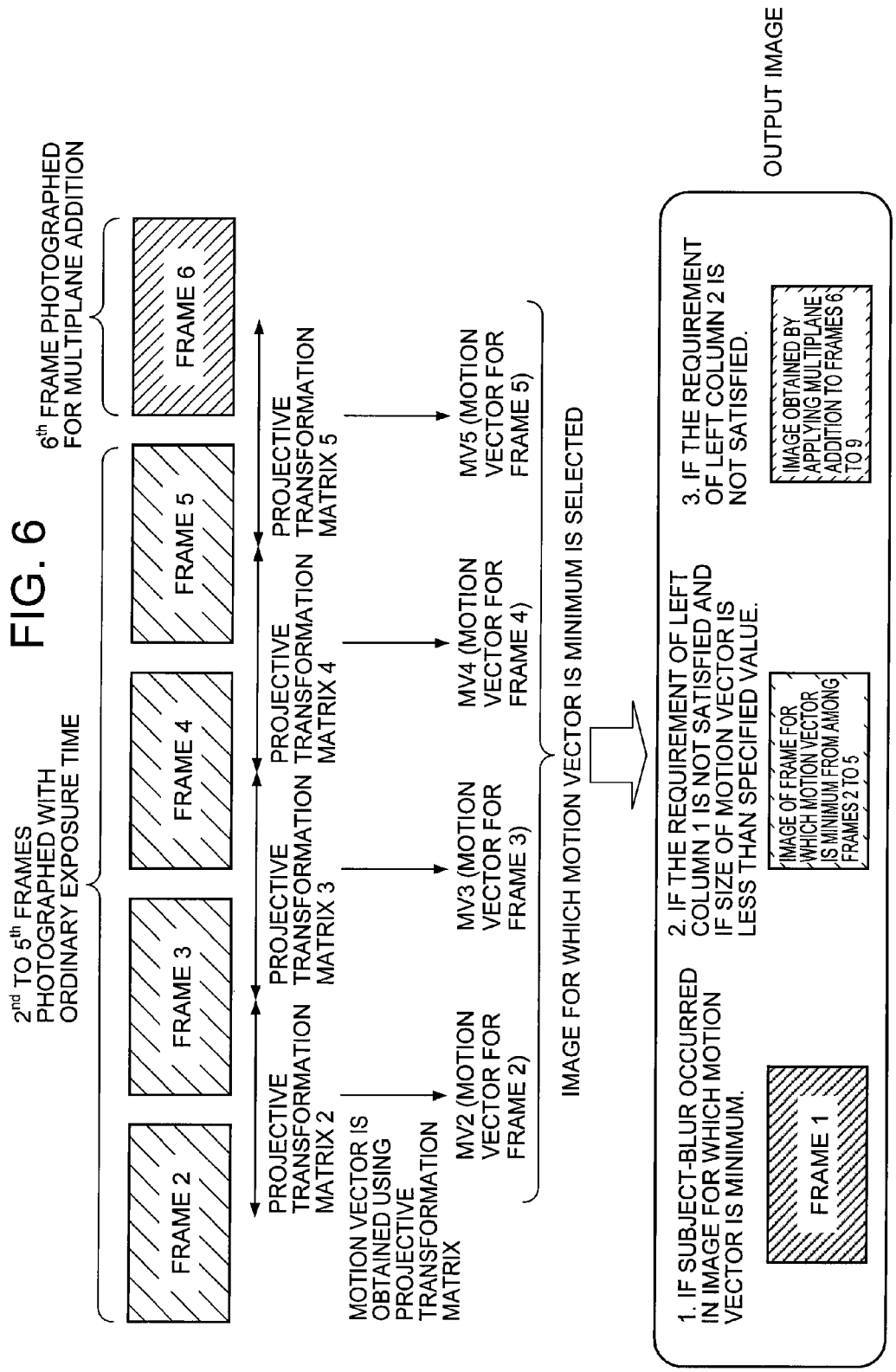

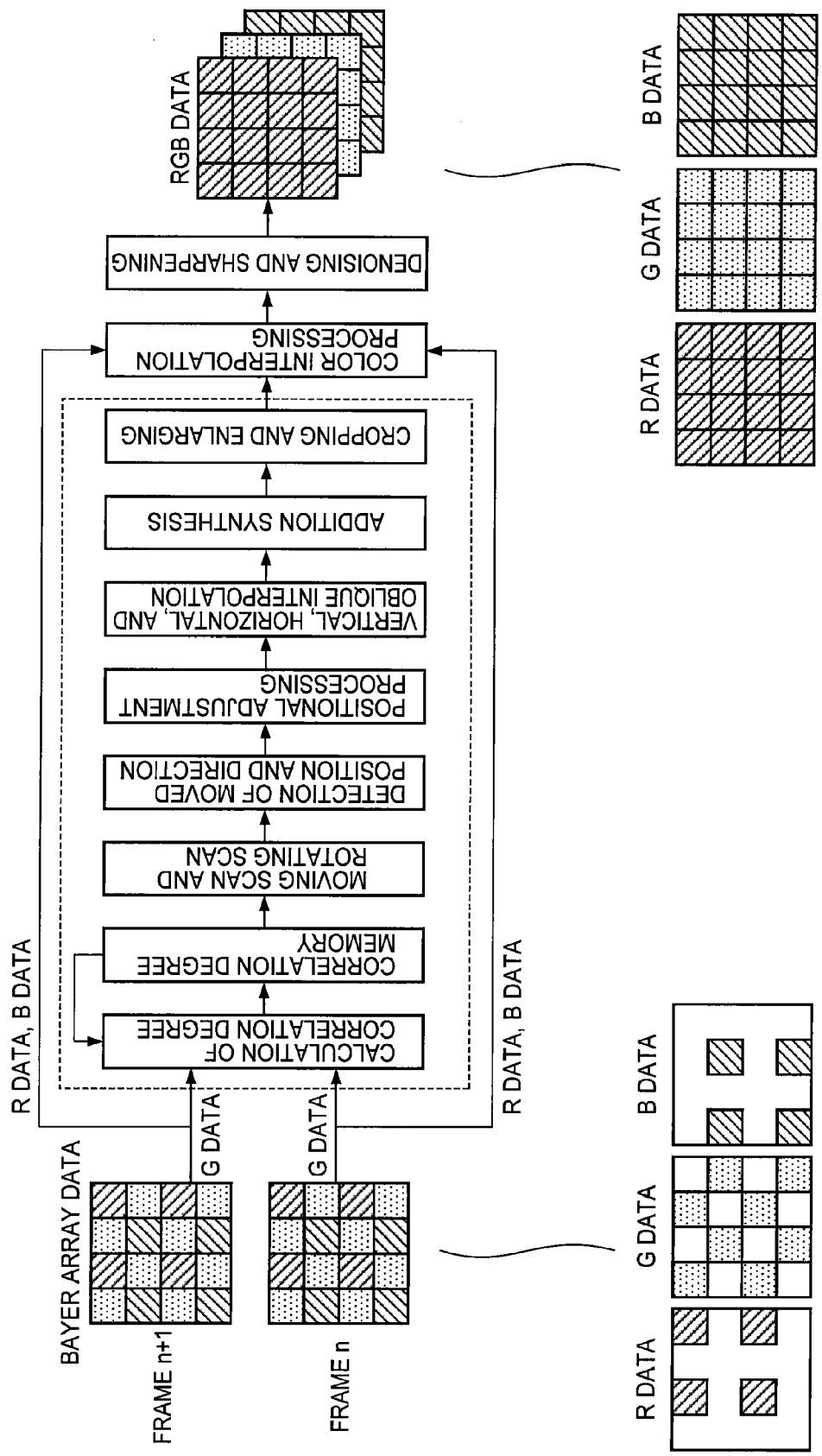

IMAGE CAPTURING DEVICE, IMAGE
CAPTURING METHOD, AND STORAGE
MEDIUM HAVING STORED THEREIN
IMAGE CAPTURING PROGRAM

This application is based on and claims the benefit of priority from Japanese Patent Application No. 2009-033913, filed on 17 Feb. 2009, the content of which is incorporated herein by reference.

BACKGROUND OF THE INVENTION

1. Field of the Invention

The present invention relates to an image capturing device, image capturing method, and a storage medium having stored therein an image capturing program.

2. Related Art

Conventionally, as a method of correcting blur caused by hand movement for a digital camera, an electronic hand-blur correction method is known. In such a method, a plurality of images is consecutively captured and pixels corresponding to each of the images are added together. For example, by adopting a multiplane addition method in which multiple consecutive images captured at 60 frames per second for all pixels are processed by adding together, it is possible to acquire an image with an S/N (signal to noise) ratio several times better than that of a single image.

With regard to such an electronic hand-blur correction method using the multiplane addition method described above, effective hand-blur correction is performed if photography is carried out under conditions in which hand-blur correction is required, for example, in a state in which a certain level of blur caused by hand movement has occurred. However, a drawback is encountered in that hand-blur correction is still performed even under conditions in which photography does not require hand-blur correction, for example, in a state in which either no blur caused by hand motion or an extremely small level of blur caused by hand movement has occurred. In such a case, an unnecessary lowering of image quality may be caused due to the addition processing carried out, for example, by adding an image contaminated with noise to the other images, or in a state in which positions of the images are not properly aligned. In order to solve this problem, there is a method of performing the addition processing only in a case in which a certain condition is detected for which it is necessary to perform the hand-blur correction (see Japanese Patent Laid-open Application No. 2008-92005).

However, with regard to this method, whether to perform multiplane addition processing is determined by the digital camera before photography (such as when the shutter button is being half-pressed) based on whether the environment is one in which blur caused by hand movement is likely, for example, whether the environment in which photography is to be carried out is slightly dark or not. Therefore, conditions at the time of decision and at the time of actual photography (for example, when the shutter button is full-pressed) do not always match, resulting in an expected result of hand-blur correction not always being achieved.

SUMMARY OF THE INVENTION

In accordance with a first aspect, there is provided an image capturing device, comprising: an image capturing means for acquiring images of a first group consecutive in time in which a subject is photographed for a first exposure time, and images of a second group consecutive in time in which a subject is photographed for a second exposure time; a hand-blur determination means for determining whether blur caused by hand movement has occurred during acquisition of the images of the first group by way of the image capturing means; an image-blur determination means for determining whether image blur of a subject has occurred during acquisition of the images of the first group by way of the image capturing means; and a selection means for selecting either an image acquired from the images of the first group or an image acquired from the images of the second group in accordance with a determination result by the hand-blur determination means and a determination result by the image-blur determination means.

In accordance with a second aspect of the present invention, there is provided an image capturing method, comprising: an acquiring step of acquiring images of a first group consecutive in a time series photographed with a first exposure time of a subject, and images of a second group consecutive in a time series photographed with a second exposure time of a subject; a hand-blur determining step of determining whether blur caused by hand movement has occurred during acquisition of the images of the first group; an image-blur determining step of determining whether image blur has occurred during acquisition of the images of the first group; and a selecting step of selecting either an image acquired from the images of the first group or an image acquired from the images of the second group, in accordance with respective determination results of the hand-blur determining step and of the image-blur determining step.

A storage medium having stored therein an image capturing program enabling a computer of an image capturing device to carry out: an acquiring step of acquiring images of a first group consecutive in a time series photographed with a first exposure time of a subject, and images of a second group consecutive in a time series photographed with a second exposure time of a subject; a hand-blur determining step of determining whether blur caused by hand movement has occurred during acquisition of the images of the first group; an image-blur determining step of determining whether image blur has occurred during acquisition of the images of the first group, and a selecting step of selecting either an image acquired from the images of the first group or an image acquired from the images of the second group in accordance with respective determination results of the hand-blur determining step and of the image-blur determining step.

BRIEF DESCRIPTION OF THE DRAWINGS

FIG. 2 is a flowchart showing a processing procedure of a CPU core when a recording mode is set;

FIG. 6 is a diagram illustrating processing of selecting an image to be outputted; and FIG. 7 is a diagram illustrating multiplane addition synthesis.

DETAILED DESCRIPTION OF THE INVENTION

Figure 1:
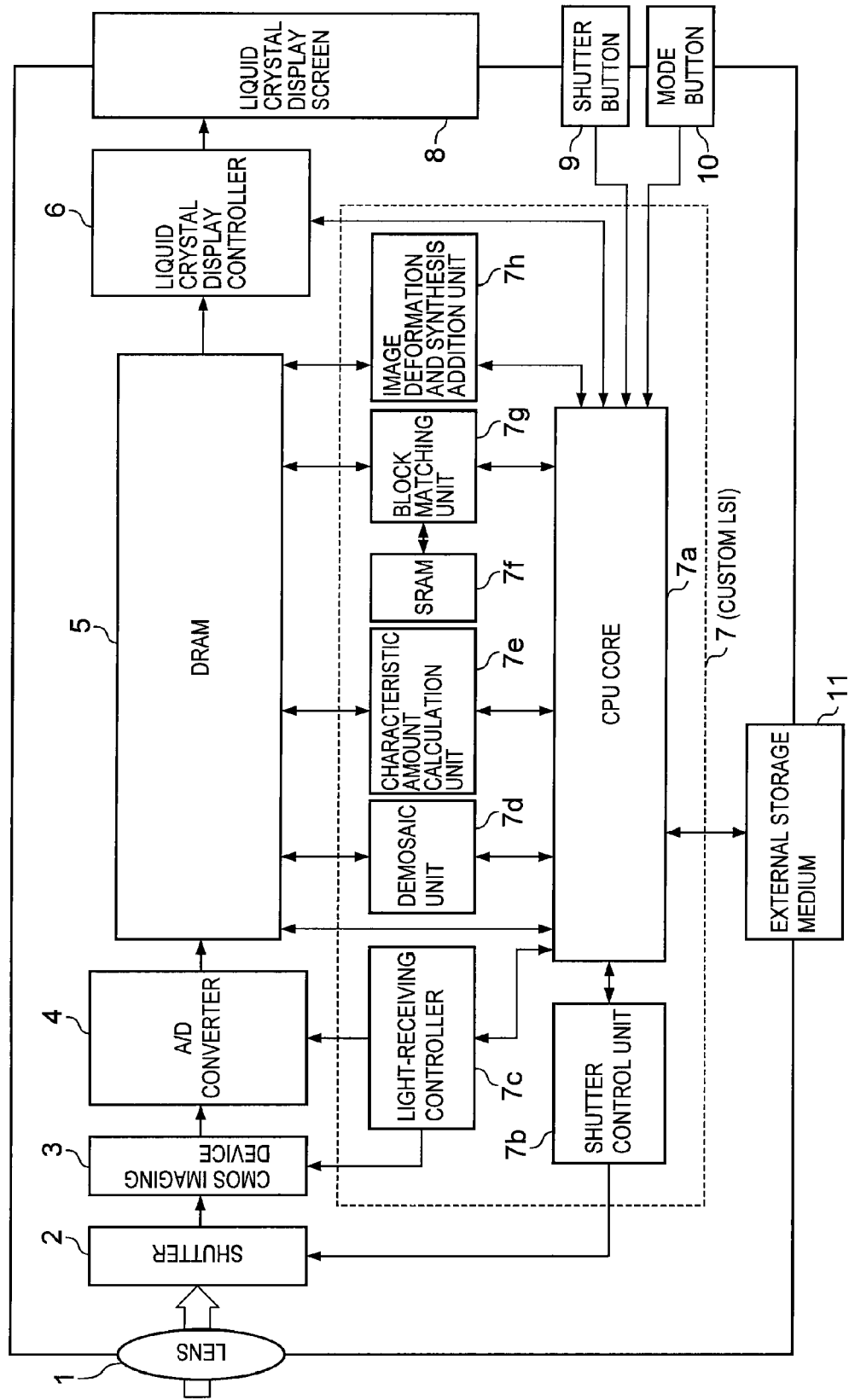
FIG. 1 is a block diagram showing an electrical configuration of an embodiment of an image capturing device (a digital camera) according to the present invention.

FIG. 1 is a block diagram showing an electrical configuration of a digital camera which is an embodiment of an image capturing device according to the present invention. This digital camera has a recording mode for carrying out photography in a base operational mode, and a playback mode for playing back a photographed image.

As shown in FIG. 1, the digital camera of the present embodiment includes a photographic lens 1, a CMOS imaging device 3 which receives photographic light gathered by way of the photographic lens 1 through a shutter 2 and also applies photoelectric conversion to an optical image of a subject formed on the light-receiving surface and outputs as an image signal, an A/D converter 4 which converts an output signal of the CMOS imaging device 3 to digital image data, and DRAM 5 which sequentially stores image data after conversion. It should be added that data of a plurality of images is stored in the DRAM 4.

Operation of the shutter 2 is controlled by way of the shutter control unit 7b according to a command of the CPU core 7a, and operation of the CMOS imaging device 3 and the A/D converter 4 is controlled by way of the light-receiving controller 7c according to a command of the CPU core 7a. One image of image data stored in the DRAM 5, i.e. RAW data, is interpolated with color information for each pixel by way of the demosaic unit 7d and converted to YUV data, and then displayed on the liquid crystal display screen 8 through the liquid crystal display controller 6. It should be noted that the converted YUV data is also temporarily stored in the DRAM 5.

The image data converted into YUV data by way of the demosaic unit 7d at the time of photography in recording mode, after being compressed according to such a predetermined compression method as JPEG by way of the CPU core 7a, is stored as a still image file or a video file by an external storage medium 11. Image data stored in the external storage medium 11, in playback mode, is displayed on the liquid crystal display screen 8 through the liquid crystal display controller 6 after being read out from the CPU core 7a, as necessary, and uncompressed. It should be noted that the external storage medium 11 can be configured of a memory card that is removable from the camera main unit, a flash memory built into the camera main unit, or the like.

Furthermore, a characteristic amount calculation unit 7e, SRAM 7f, a block matching unit 7g, an image transformation synthesis addition unit 7h, as well as a shutter button 9, and a mode button 10 are connected to the CPU core 7a. It should be noted that, although various programs for operation of the CPU core 7a and various data used during execution of the programs are stored in the memory of the CPU core 7a, the programs and data may be stored in memory that is separate from the CPU core 7a.

The CPU core 7a follows the program and controls operation of each unit of the digital camera according to a pressing operation of the shutter button 9, functioning as an image capturing means, a hand-blur determination means, an image-blur determination means, and a selection means according to the present invention.

The block matching unit 7g functions as a calculation means according to the present invention, and uses the SRAM 7f as working memory, carries out matching among a plurality of images captured by way of the CMOS imaging device 3, acquires a vector indicating a relative displacement amount and displacement direction of the subject portion, and performs outputs thereof to the CPU core 7a.

The image deformation and synthesis addition unit 7h functions as an image processing means according to the present invention that aligns a plurality of images captured by way of the CMOS imaging device 3 and carries out synthesizing thereof, in accordance with an instruction of the CPU core 7a.

Next, an operation carried out by the digital camera made with the above configuration, at a time in which recording mode has been set is explained. FIG. 2 is a flowchart showing a processing procedure of the CPU core 7a at a time in which the recording mode has been set.

First, digital hand-blur correction mode is set by way of a user operating a mode button 10 of the digital camera (Step A1). As a result, the digital camera automatically carries out hand-blur correction.

Next, when the user presses the shutter button 9 of the digital camera once, the CPU core 7a, upon detection thereof, carries out consecutive photography of 9 images consisting of images of a first group, images of a second group, and a third image (Step A2). More specifically, 9 images consecutive in time are acquired by way of the CMOS imaging device 3. Of the 9 images, the initial one image, which corresponds to the above-mentioned third image, is acquired by carrying out subject-blur suppression photography for a third exposure time at a high sensitivity capable of dealing with photography in which the subject is blurred or at a dark location, for example, a photographic sensitivity equivalent to ISO 1600. The next four images, which correspond to the images of the first group, are acquired by carrying out photography at an ordinary exposure time (a "first exposure time"). The last four images, which correspond to the images of the second group, are acquired by carrying out photography at a shutter time (a "second exposure time") two levels shorter than an ordinary exposure time. Furthermore, at a time of photography, optical hand-blur correction in which the CMOS imaging device 3 operates by shifting (changing position) is also carried out.

The CPU core 7a acquires RAW data for each of the 9 images consecutive in time by way of the CMOS imaging device 3, and stores in the DRAM 5 (Step A3). Furthermore, RAW data of each are converted into YUV data and luminance image data consisting of only a luminance component by way of a demosaic unit 7d, and image data after conversion are stored in the DRAM 5 (Step A3). Here, the YUV data are image data to be used for synthesis, and the luminance image data are compressed image data of a sufficient size for positional alignment work during synthesis of a plurality of images (YUV data).

Figure 3A:
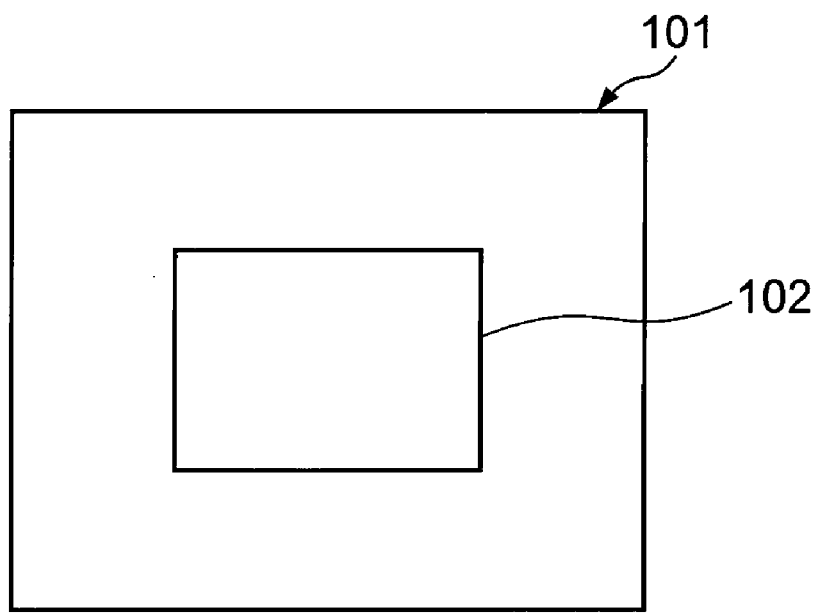
FIG. 3A is a block diagram showing a window to be set for a reference image.
Figure 3B:
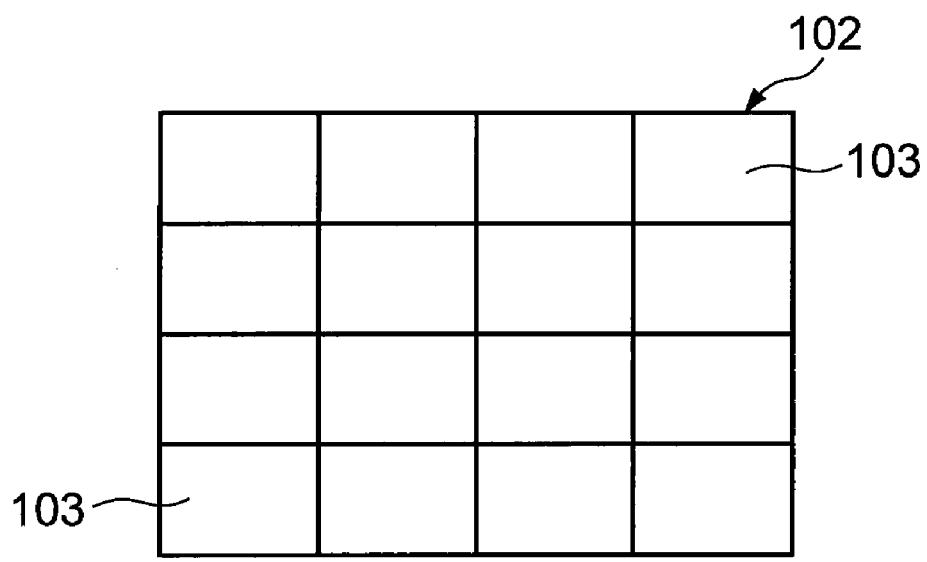
FIG. 3B is a block diagram showing a plurality of blocks dividing the window.

Next, the first image of the luminance image data is set as a reference image, and in that reference image, a window of predetermined size is set in a center portion in the frame. Also, the interior of the window is divided into a plurality of blocks in units of 16 pixels in height by 16 pixels in width, and block matching is carried out on pixels between frames adjacent to each another (Step A4). More specifically, as shown in FIG. 3, a window 102 (an area of (½)×(½) of the center of the reference image 101), set in the reference image 101, is divided into a plurality (4×4=16) of blocks 103.

Figure 4:
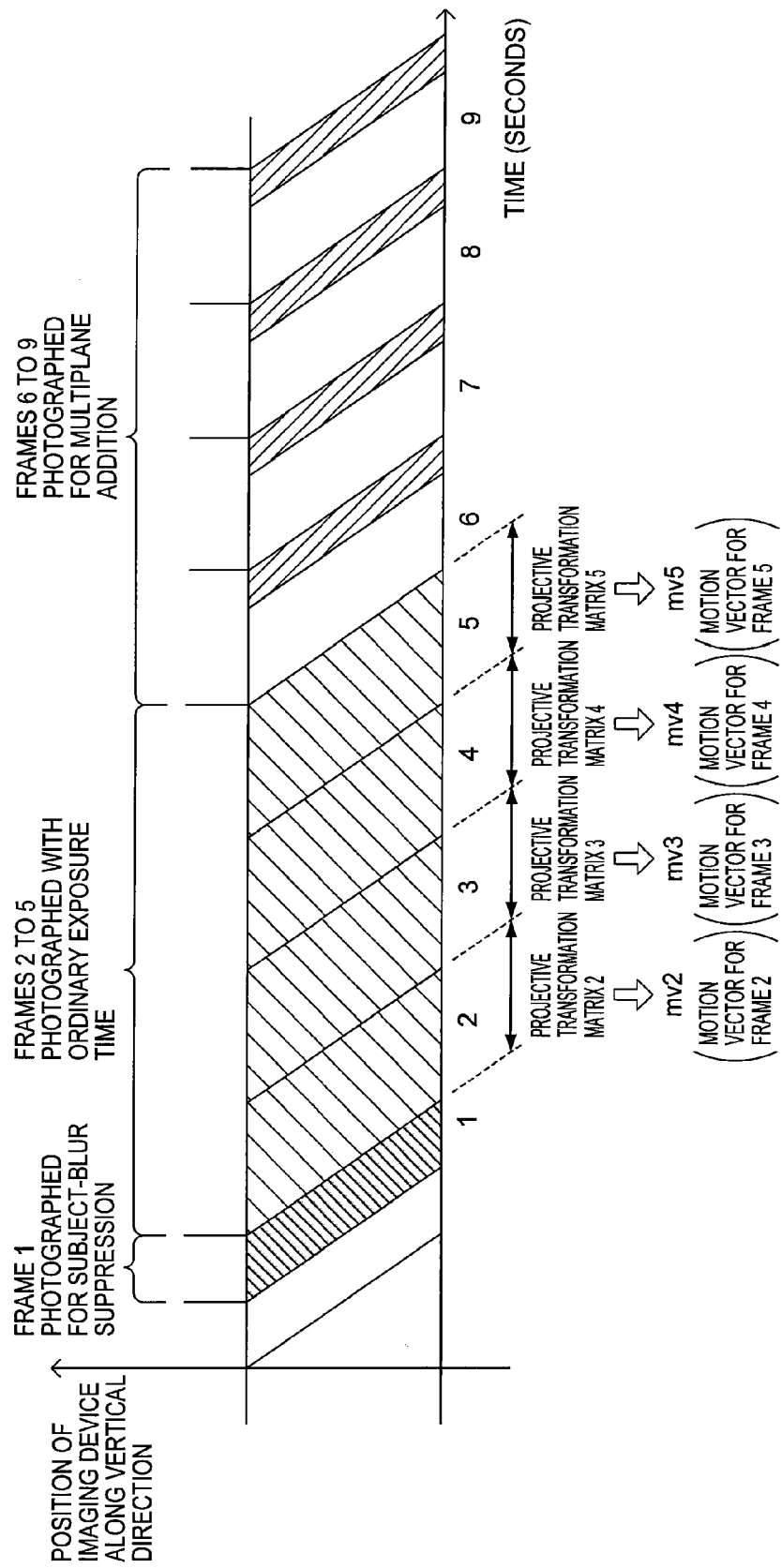
FIG. 4 is a diagram illustrating projective transformation matrices and calculation of motion vectors for respective frames.

Block matching in which only a subject portion is set as a tracking target is carried out by the block matching unit 7g for the blocks 103 acquired in this manner. The CPU core 7a generates a projective matrix representing a positional relationship between adjacent frame images using a specific motion vector showing a displacement amount of or below a predetermined distance (Step A5). That is to say, a projective matrix is obtained based only on a correct motion vector, which exclude motion vectors that should not have been acquired (were clearly acquired erroneously). It should be noted that the projective matrix in the present embodiment is generated by way of the RANSAC method. The RANSAC method follows a model estimation algorithm which repeatedly examines all of hypothetical sets of data generated based on a randomly selected sample. In this case, a set of positions is randomly selected, a candidate of a projective transformation matrix is calculated corresponding to the set of selected positions, and the results of projective transformation when the coordinates of all positions are subject to the projective transformation based on the calculated formula are evaluated for a degree of matching. The calculation and evaluation are repeated, and the projective transformation matrix used when the best evaluated values are acquired is adopted. According to this technique, as shown in FIG. 4, a projective transformation matrix 2 representing a positional relationship between frame 3, with frame 2 as a reference image, is obtained.

Then, the processing of the above-mentioned Steps A4 and A5 is repeated as the luminance image data is sequentially changed, and a projective transformation matrix is generated for images from the second to the fifth consecutive in time (Step A6). More specifically, a projective transformation matrix 3 representing a positional relationship between frame 4, with frame 3 as a reference image, is obtained; then a projective transformation matrix 5 representing a positional relationship between frame 5, with frame 4 as a reference image, is obtained; and then a projective transformation matrix 6 representing a positional relationship between frame 6, with frame 5 as a reference image, is obtained.

Figure 5:
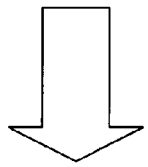
FIG. 5 is a diagram illustrating calculation of size of a motion vector indicative of a parallel displacement component.

After the previously described projective transformation matrices for the images (luminance image data) up to frame 5 are generated, that is to say, after the positional relationships of the subject between each of the successive images from the second to the fifth images are calculated ("YES" in Step A6), then a parallel displacement component between each of the adjacent frames is calculated from the projective transformation matrix acquired in Step A5 (Step A7). The calculation of the parallel displacement component (size of the motion vector) can be obtained according to (the formula) $(s^2+t^2)^{1/2}$, as shown in FIG. 5.

For the image for which the size of the parallel displacement component calculated in Step A7 is a minimum, it is determined whether image blur of the subject has occurred (Step A8). For the image blur of the subject, for all the blocks 103, the differences of the sum of squares are taken for the blocks of identical position in adjacent frames, and if those values are greater than a predetermined value for even one block, it is determined that image blur has occurred.

If it is determined that image blur has occurred in Step A8, as shown in FIG. 6, the image for subject-blur suppression, which is the first image (Frame 1), is selected (Step A9), and the image is stored in the external storage medium 11.

On the other hand, in Step A8, if it is determined that image blur of the subject has not occurred, for an image having a size of the parallel displacement component that is a minimum, it is determined whether the size of the parallel displacement component is less than or equal to a predetermined value (for example, 2 pixels), and it is determined whether blur caused by hand movement has occurred (Step A10). It should be noted that, in the present embodiment, the predetermined value is described as 2 pixels; however, the present invention is not limited thereto. An optimal predetermined value can be set according to the implementation.

If the size of the parallel displacement component in Step A10 is less than or equal to 2 pixels, then it is determined that blur caused by hand movement is sufficiently small, and as shown in FIG. 6, an image such that the parallel displacement component is a minimum is selected (Step A11), and the image is stored in the external storage medium 11.

On the other hand, if the size of the parallel displacement component in Step A10 is not less than or equal to 2 pixels, as shown in FIG. 6, the image deformation and synthesis addition unit 7h synthesizes, by way of multiplane addition, images 6 through 9 photographed using the second exposure time to generate a new image (Step A12), and stores the new image in the external storage medium 11.

The image deformation and synthesis addition unit 7h can carry out high sensitivity processing having an increased sensitizing effect by way of carrying out multiplane addition synthesis processing using Bayer array data for the sixth to ninth images. More specifically, as shown in FIG. 7, of the Bayer array data for each pixel, a degree of correlation of G (green) images, which accurately reflect a luminance component and a resolution, is obtained and positional adjustment is carried out, and also interpolation processing is carried out for vertical, horizontal, and diagonal pixels that are missing in the Bayer array data, and the full G pixel data are generated. Positional adjustment and color interpolation processing are carried out for the R (red) and B (blue) data, in accordance with positional adjustment results of G (green) data. Then, the R (red), B (blue), and G (green) data are converted to full-size RGB data. During the positional adjustment processing, furthermore, it is also suitable to perform interpolation processing according to a rotational position by also detecting a rotational direction, and carrying out coordinate rotation conversion by way of affine transformation for positional adjustment. Alternatively, it is also suitable to extract an area image of a main subject of a center or a foreground, and to perform addition after moving to a position such that an outline form or a characteristic amount of a subject or a background overlaps, and then carry out positional adjustment.

As explained above, in the present embodiment, initially one image photographed with a third exposure time for subject-blur suppression, then a plurality of images photographed with an ordinary exposure time for photography of a single image (a first exposure time), and a plurality of images photographed with a second exposure time for multiplane addition in which a shutter time is shortened are consecutively photographed. Then, a projective transformation matrix representing a positional relationship between adjacent images in images consecutive in time is obtained for all pairs of adjacent images, and an image with minimum blur caused by hand movement in the images of the first group photographed using the ordinary exposure time is selected. If image blur has not occurred in the subject of the image and blur caused by hand movement is sufficiently small, then the image is selected. Therefore, it is possible to select an optimal image having less blur depending on the photographing situation and to perform output thereof. Furthermore, in the first group of images that are photographed using the ordinary exposure time, an image having the minimum blur caused by hand movement is selected, and if image blur of the subject has occurred in the selected image, the image for subject-blur suppression is used. Therefore, it is possible to select an optimal image having less blur depending on the photographic situation and to perform output thereof. Furthermore, if blur caused by hand movement has occurred in the images selected above, multiplane addition is applied to the images of the second group photographed for multiplane addition, and a new image is generated. Therefore, it is possible to output an optimal image having less blur depending on the photographic situation.

In the present embodiment, a determination is made regarding whether there is image blur from the photographed image itself, and therefore, there is no situation of erroneous recognition due to a time difference such as that of blur determination when the shutter button is half-pressed. Furthermore, it is also determined whether there is any suitable image with a lower level of blur from among the images photographed consecutively in time with ordinary exposure time; therefore, it is possible to select an image with sufficiently low blur and to perform output thereof. Furthermore, it is possible to avoid lowering of image quality as a result of applying multiplane addition in a situation which does not require multiplane addition.

In addition, if optical hand-blur correction is carried out by way of moving a CMOS imaging device based on a gyro sensor at a time of continuous shooting of images, then a size of the gyro sensor value at a time of image photography does not always reflect a size of blur caused by hand movement in the image, causing a hand-blur determination by way of the gyro sensor to be inaccurate. However, in the present embodiment, a positional relationship is obtained based on a captured image after the aforementioned optical hand-blur correction, and therefore, it is possible to detect the occurrence of a blur accurately.

What is claimed is:

1. An image capturing device, comprising:
   an image capturing unit which acquires a predetermined number of images, the predetermined number of images including images of a first group consecutive in time in which a subject is photographed for a first exposure time immediately in response to an instruction to photograph, and images of a second group consecutive in time in which the subject is photographed for a second exposure time that is different from the first exposure time;
   a hand-blur determination unit which determines whether blur caused by hand movement has occurred during acquisition of the images of the first group by the image capturing unit;
   an image-blur determination unit which determines whether image blur of the subject has occurred during acquisition of the images of the first group by the image capturing unit; and
   a selection unit which selects either an image acquired from the images of the first group or an image acquired from the images of the second group, in accordance with a determination result by the hand-blur determination unit and a determination result by the image-blur determination unit.

2. An image capturing device as set forth in claim 1, wherein the selection unit selects an image acquired from the images of the second group in a case in which the image-blur determination unit determines that no image blur has occurred and the hand-blur determination unit determines that blur caused by hand movement has occurred.

3. An image capturing device as set forth in claim 1, further comprising an image processing unit which synthesizes the images of the second group to generate a new image, wherein the image acquired from the images of the second group is the new image.

4. An image capturing device as set forth in claim 1, wherein the selection unit selects an image acquired from the images of the first group in a case in which the image-blur determination unit determines that no image blur has occurred and the hand-blur determination unit determines that no blur caused by hand movement has occurred.

5. An image capturing device as set forth in claim 1, further comprising a calculation unit which obtains projective transformation matrices for images consecutive in time from among the images of the first group, and calculates a size of a motion vector for each projective transformation matrix,
   wherein the image-blur determination unit determines whether image blur has occurred for the image for which the size of the motion vector calculated by the calculation unit is minimum.

6. An image capturing device as set forth in claim 5, wherein the hand-blur determination unit determines whether blur caused by hand movement has occurred for the image for which the size of the motion vector is minimum, based on whether the size of the motion vector exceeds a predetermined threshold.

7. An image capturing device as set forth in claim 1, wherein:
   the image capturing unit acquires a third image in which a subject is photographed with a higher sensitivity than a sensitivity with which either images of the first group are photographed or images of the second group are photographed, and
   the selection unit selects any one of the images acquired from the images of the first group, the images of the second group, and the third image, and if image blur is determined to have occurred by the image-blur determination unit, selects the third image.

8. An image capturing device as set forth in claim 1, wherein the second exposure time is shorter than the first exposure time.

9. An image capturing method, the method comprising:
   an acquiring step of acquiring a predetermined number of images, the predetermined number of images including images of a first group consecutive in time in which a subject is photographed with a first exposure time immediately in response to an instruction to photograph, and images of a second group consecutive in time in which the subject is photographed with a second exposure time that is different from the first exposure time;
   a hand-blur determining step of determining whether blur caused by hand movement has occurred during acquisition of the images of the first group;
   an image-blur determining step of determining whether image blur has occurred during acquisition of the images of the first group; and
   a selecting step of selecting either an image acquired from the images of the first group or an image acquired from the images of the second group in accordance with respective determination results of the hand-blur determining step and of the image-blur determining step.

10. A non-transitory computer readable storage medium having stored therein an image capturing program which controls a computer of an image capturing device to carry out a process comprising:
    an acquiring step of acquiring a predetermined number of images, the predetermined number of images including images of a first group consecutive in time in which a subject is photographed with a first exposure time immediately in response to an instruction to photograph, and images of a second group consecutive in time in which the subject is photographed with a second exposure time that is different from the first exposure time;
    a hand-blur determining step of determining whether blur caused by hand movement has occurred during acquisition of the images of the first group;
    an image-blur determining step of determining whether image blur has occurred during acquisition of the images of the first group; and
    a selecting step of selecting either an image acquired from the images of the first group or an image acquired from the images of the second group in accordance with respective determination results of the hand-blur determining step and of the image-blur determining step.

* * * * *